United States Patent
Constantine et al.

(10) Patent No.: US 11,688,000 B1
(45) Date of Patent: **\*Jun. 27, 2023**

(54) ELECTRONIC DISCLOSURE DELIVERY SYSTEM AND METHOD

(71) Applicant: Wells Fargo Bank, N.A., San Francisco, CA (US)

(72) Inventors: Erin Constantine, San Francisco, CA (US); Kimberly Robin Nelson, Mooresville, NC (US); Bryan William Huisman, Eagan, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,051

(22) Filed: Apr. 11, 2022

Related U.S. Application Data

(63) Continuation of application No. 16/188,591, filed on Nov. 13, 2018, now Pat. No. 11,301,928, which is a continuation of application No. 14/010,282, filed on Aug. 26, 2013, now Pat. No. 10,163,153.

(51) Int. Cl.
*G06Q 40/00* (2023.01)

(52) U.S. Cl.
CPC .................................. *G06Q 40/00* (2013.01)

(58) Field of Classification Search
CPC ..................................................... G06Q 40/00
See application file for complete search history.

(56) References Cited

U.S. PATENT DOCUMENTS

| | | | | |
|---|---|---|---|---|
| 7,574,501 | B2 * | 8/2009 | Louie | G06Q 10/06 709/224 |
| 8,943,122 | B2 | 1/2015 | Leblanc et al. | |
| 9,053,411 | B2 | 6/2015 | Lin et al. | |
| 9,450,904 | B2 | 9/2016 | Wheeler et al. | |
| 2001/0042088 | A1 * | 11/2001 | Hotchkiss | G16H 70/20 715/255 |
| 2002/0007343 | A1 | 1/2002 | Oyama et al. | |
| 2002/0174010 | A1 | 11/2002 | Rice, III | |
| 2005/0097046 | A1 | 5/2005 | Singfield | |

(Continued)

FOREIGN PATENT DOCUMENTS

| WO | WO-99/08215 A1 | 2/1999 |
| WO | WO-2006/126056 A2 | 11/2006 |
| WO | WO-2012/094553 A1 | 7/2012 |

OTHER PUBLICATIONS

A Survey of Payment Card Industry Data Security Standard Publisher: IEEE Cite This PDF Jing Liu; Yang Xiao; Hui Chen; Suat Ozdemir; Srinivas Dodle; Vikas Singh (Year: 2010).*

(Continued)

*Primary Examiner* — Bruce I Ebersman
*Assistant Examiner* — John A Anderson
(74) *Attorney, Agent, or Firm* — Foley & Lardner LLP

(57) ABSTRACT

A system includes a processor and machine readable storage media having instructions stored therein. The instructions, when executed by the processor, cause the processor to receive input indicating whether a customer of a financial institution has a mobile device, to receive an indication from the customer via the mobile device acknowledging that the customer has been given access to disclosure documents, and to provide the customer with a financial product based on the indication.

17 Claims, 7 Drawing Sheets

(56) References Cited

U.S. PATENT DOCUMENTS

| | | |
|---|---|---|
| 2005/0210047 A1* | 9/2005 | Hayes .................... G06F 16/25 |
| 2006/0143107 A1 | 6/2006 | Dumas et al. |
| 2008/0189185 A1 | 8/2008 | Matsuo et al. |
| 2008/0208743 A1* | 8/2008 | Arthur .................. G06Q 40/00 |
| | | 705/41 |
| 2010/0222037 A1 | 9/2010 | Dragt |
| 2011/0208629 A1 | 8/2011 | Benefield et al. |
| 2011/0213658 A1 | 9/2011 | Joa et al. |
| 2011/0313948 A1 | 12/2011 | Hagerman et al. |
| 2012/0054095 A1 | 3/2012 | Lesandro et al. |
| 2012/0179677 A1 | 7/2012 | Roselli et al. |
| 2012/0240243 A1 | 9/2012 | Allardyce |
| 2014/0032400 A1 | 1/2014 | Cornforth et al. |
| 2015/0052047 A1 | 2/2015 | Piratla et al. |

OTHER PUBLICATIONS

ESign: an enterprise portal for secure document management Published in: IRI—2005 IEEE International Conference on Information Reuse and Integration, Conf, 2005. (pp. 481-486) Authors: J. Shi • J. Ouyang (Year: 2005).*

IEEE Guide for Monitoring, Information Exchange, and Control of Distributed Resources Interconnected with Electric Power Systems pp. 1-160 (Year: 2007).

* cited by examiner

ELECTRONIC DISCLOSURE DELIVERY SYSTEM AND METHOD

CROSS REFERENCE TO RELATED APPLICATION

This application is a continuation of U.S. patent application Ser. No. 16/188,591, titled "Electronic Disclosure Delivery System and Method", filed Nov. 13, 2018, which is a continuation of U.S. patent application Ser. No. 14/010,282, titled "Electronic Disclosure Delivery System and Method", filed Aug. 26, 2013, which is hereby incorporated by reference in its entirety.

BACKGROUND

Financial institutions such as banks offer a variety of products to meet the varying needs of their customers. For example, a financial institution may offer a diverse range of deposit accounts for consumer and business customers, such as savings accounts, checking accounts, certificates of deposit, money market accounts, and retirement accounts. Depending on the type of account, the financial institution may be required under various laws and regulations, such as the Truth in Savings Act (TISA) and Federal Reserve Regulation DD, to provide the customer with numerous and/or lengthy disclosure materials either before the account is opened (e.g., where the customer is present at a store location of the financial institution) or within 10 business days after the account is opened (e.g., where the customer is applying for an account via telephone). For example, such required disclosure materials may include a copy of the account agreement terms and conditions, including any balance requirements, transaction limitations, time requirements, early withdrawal penalties, and other related information. Additionally, the financial institution may be required to provide an account fee and information schedule, a privacy policy, a rate sheet for interest earning accounts, policies governing overdraft protection services, bill pay services, electronic or mobile banking, and any additional disclosures that may vary depending on the particular type of account. These disclosure materials may also be provided in multiple languages and include various addendums for updates to policies and changes in terms and conditions.

In addition to the many various types of information that may be required, disclosures under Regulation DD must be provided in writing. Accordingly, lending institutions may generate numerous printed pages of disclosure materials to be handed to customers opening an account in person, or mailed to customers opening an account via telephone, which can be both costly to the financial institution and inconvenient or cumbersome for the customer. Regulation DD disclosures may, however, be provided to the customer in an electronic format. For example, the Electronic Signatures in Global and National Commerce Act (E-Sign Act) permits financial institutions to satisfy the requirement under Regulation DD that disclosure materials be provided in writing by providing electronic disclosure materials. However, the financial institution may need to obtain the customer's affirmative consent prior to providing any disclosure materials in electronic format. Furthermore, before consent can be given, the financial institution may need to provide the customer with a statement of his or her rights and obligations with respect to electronic delivery. Additionally, the financial institution may need to establish an audit trail for the account such that delivery and consent regarding the disclosure documents may be demonstrated to a regulatory agency. Furthermore, the financial institution may need to validate contact information provided by the customer. Given the costs and complexities associated with disclosure delivery requirements, there is an ongoing need for improved electronic disclosure delivery systems and methods.

SUMMARY

According to an exemplary embodiment, a system includes a processor and machine readable storage media having instructions stored therein. The instructions, when executed by the processor, cause the processor to receive input indicating whether a customer of a financial institution has a mobile device, to receive an indication from the customer via the mobile device acknowledging that the customer has been given access to disclosure documents, and to provide the customer with a financial product based on the indication.

According to another exemplary embodiment, a method includes receiving input indicating whether a customer seeking to open an account at a financial institution has a mobile device, and sending an electronic message accessible by the mobile device. The electronic message is configured to provide access to an application. The application is configured to provide access to disclosure documents related to the account upon being accessed by the mobile device. The method further includes determining whether the mobile device has accessed the application, providing a confirmation to a user at the financial institution indicating that the mobile device has accessed the application, and establishing the account for the customer based on the confirmation.

According to another exemplary embodiment, a method includes receiving input indicating whether a customer seeking to open an account at a financial institution has a mobile device, and sending an electronic message accessible by the mobile device. The electronic message contains a network address for an application. The application is configured to provide access to disclosure documents related to the account upon being accessed by the mobile device. The method further includes receiving a request from the mobile device to access the application. The request contains a customer identifier associated with the account. The method further includes determining whether the customer has provided consent regarding the documents, providing a confirmation to a user at the financial institution indicating that the customer has provided consent regarding the documents, providing a confirmation to the user indicating that the mobile device has accessed the application, providing access to the documents based on the customer identifier, and establishing the account for the customer based on the confirmation that the mobile device has accessed the application.

DETAILED DESCRIPTION

Figure 1:
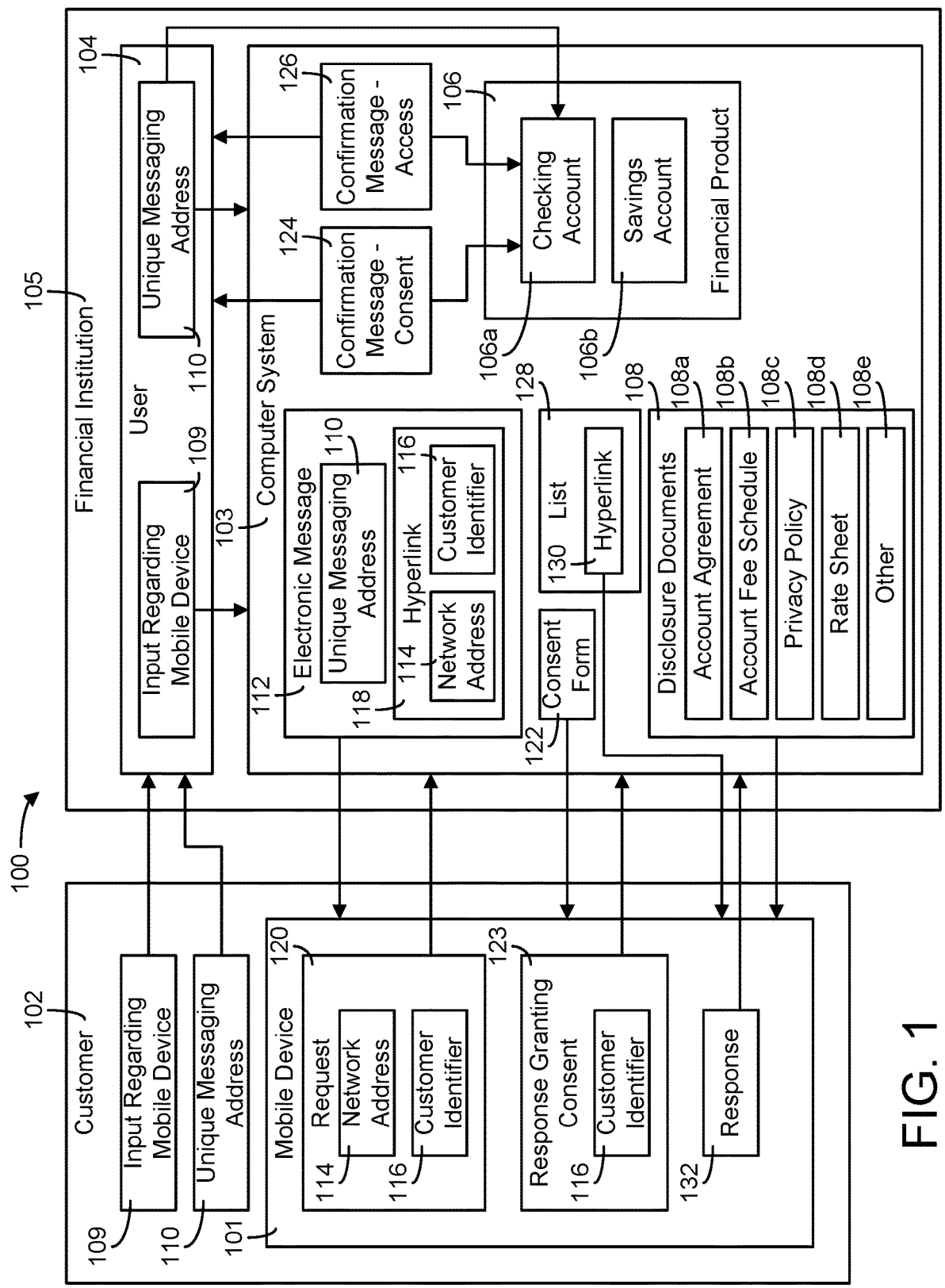
FIG. 1 is a data flow diagram of a process for providing electronic disclosure delivery according to an exemplary embodiment.

According to various exemplary embodiments, electronic delivery of disclosure documents is provided to individuals, businesses, consumers, account holders or other types of customers attempting to procure financial products such as deposit accounts from a financial institution. A customer seeking to open an account may provide input to a user associated with a financial institution, such as a banker, indicating whether the customer has a mobile device, such as a cellular phone, smart phone, personal digital assistant (PDA), tablet device, laptop computer or other device, and further indicating that the customer may prefer to access electronic disclosure documents via the mobile device. The customer may further provide the banker or other user with a unique messaging address, such as a personal or business email address, that may be used to contact the customer via the mobile device. The customer may provide such input to the banker at, for example, a store location of the financial institution, or via a telephone connection with the banker.

The banker may provide this input to a computer system, such as a server hosting an application configured to facilitate electronic delivery of disclosure documents. In particular, the application may be configured to provide access to electronic disclosure documents related to the account upon being accessed by the mobile device. The application may generate and send an electronic message, such as an email or text message addressed to the customer's unique messaging address, that the customer may access using the mobile device. The electronic message may contain a network address for the application in the form of, for example, a hyperlink that may be selected by the customer using the mobile device in order to create and send a request for access to the application. The request may serve as an indication from the customer via the mobile device acknowledging that the customer has been given access to the disclosure documents. The request may contain, for example, a customer identifier associated with the account. The application may determine whether the mobile device has accessed the application by receiving the request for access to the application from the mobile device and verifying that it contains the customer identifier associated with the account.

The application may also determine whether the customer has provided consent regarding electronic delivery of disclosure documents. For example, the application may determine whether the customer is an existing online customer of the financial institution and has previously provided global consent to receive delivery of disclosure documents in an electronic format. If the customer has not previously provided such consent to receive delivery of disclosure documents in an electronic format, the application may provide the mobile device with a consent form regarding the disclosure documents, including a statement of his or her rights and obligations with respect to electronic delivery. The consent obtained via the form may be a one-time consent for a particular account rather than a global consent.

The application may also provide a confirmation to the banker at the financial institution indicating that the mobile device has accessed the application, and that the customer has provided consent to receive delivery of disclosure documents in an electronic format. The application may also provide the mobile device with access to the electronic disclosure documents related to the account by further providing, for example, hyperlinks to network storage locations containing the disclosure documents that may be selected and viewed by the customer via the mobile device. The particular disclosure documents related to the account may be identified based on the customer identifier. The application may also establish the account for the customer based on the confirmation that the mobile device has accessed the application. The application may further store the confirmation that the mobile device has accessed the application, the confirmation that the mobile device has provided consent regarding electronic delivery of the disclosure documents, and the customer's unique messaging address in a memory location associated with the account based on the customer identifier.

As will be appreciated, the electronic disclosure delivery systems and methods described in the various exemplary embodiments may reduce the costs and complexities associated with disclosure delivery requirements. In particular, the electronic disclosure delivery systems and methods described in the various exemplary embodiments may reduce the need to generate numerous printed pages of disclosure materials to be handed to customers opening an account in person, or mailed to customers opening an account via telephone, which can be both costly to the financial institution and inconvenient or cumbersome for the customer. For example, the disclosed systems and methods provide convenient access to electronic versions of the disclosure documents that may be accessed and viewed from a mobile device.

As will further be appreciated, the electronic disclosure delivery systems and methods described in the various exemplary embodiments may also allow the financial institution to easily obtain the customer's affirmative consent prior to providing any disclosure materials in electronic format. For example, the disclosed systems and methods may quickly check for prior global consent from a customer. If no prior global consent has been given, the customer may be instantly presented with an electronic consent form when accessing the disclosure documents, including a statement of his or her rights and obligations with respect to electronic delivery. Additionally, the electronic disclosure delivery systems and methods described in the various exemplary embodiments may allow the financial institution to easily establish an audit trail for the account such that delivery and consent regarding the disclosure documents may be demonstrated to a regulatory agency. For example, the disclosed systems and methods provide for storage of the confirmation that the mobile device has accessed the application and the confirmation that the mobile device has provided consent regarding electronic delivery of the disclosure documents in a memory location associated with the account based on the customer identifier.

As will further be appreciated, the electronic disclosure delivery systems and methods described in the various exemplary embodiments may also provide for verifying that a customer's messaging address is valid and up-to-date because the customer can only access the application via the information contained in the electronic message sent to the customer's messaging address. Once the application has confirmed that the mobile device has accessed the application, an indication that the customer's unique messaging address has been verified as valid and up-to-date may be stored in a memory location associated with the account based on the customer identifier.

Referring now to FIG. 1, a data flow diagram illustrating a process 100 for providing electronic disclosure delivery according to an exemplary embodiment is shown. While process 100 is generally described in the context of a customer having a mobile device and present at a store location of a financial institution, it will be appreciated that other scenarios, such as a customer in communication with a financial institution via a telephone connection, are contemplated as well.

FIG. 1 generally illustrates an embodiment of process 100 wherein data is exchanged between a mobile device 101, such as a cellular phone, smart phone, personal digital assistant (PDA) tablet device, laptop computer or other device owned by customer 102 and a computer system 103 accessed by a user 104, such as a banker, associated with a financial institution 105, such as a bank. Process 100 typically begins with customer 102 entering a store location of financial institution 105 and seeking to obtain a financial product 106, such as a checking account 106a or a savings account 106b. For example, customer 102 may need to open a checking account and make a cash deposit. Customer 102 may proceed to a branch location of financial institution 105 and meet in person with banker 104 to open checking account 106a.

During the meeting, banker 104 may inform customer 102 as to the disclosure obligations of financial institution 105 with respect to checking account 106a, including the various disclosure documents 108 that must be provided to customer 102. Such disclosure documents may include, for example, a copy of the account agreement terms and conditions 108a, including any balance requirements, transaction limitations, time requirements, early withdrawal penalties, and other related documents such as an account fee and information schedule 108b, a privacy policy 108c, a rate sheet for interest earning accounts 108d, and other policies 108e governing, for example, overdraft protection services, bill pay services, and electronic or mobile banking.

Banker 104 may also request input 109 from customer 102, such as input 109a regarding whether disclosure documents 108 printed on paper are required, or alternatively, whether customer 102 has a mobile device 101 such that disclosure documents 108 may be delivered in electronic format. Customer 102 may respond indicating that he or she has a mobile device 101, and that he or she prefers to access disclosure documents 108 in electronic format via mobile device 101. Banker 104 may also request input from customer 102 regarding whether customer 102 may provide banker 104 with one or more unique messaging addresses 110. Unique messaging address 110 may be, for example, a personal or business email address that may be used to contact customer 102 via mobile device 101.

Figure 2:
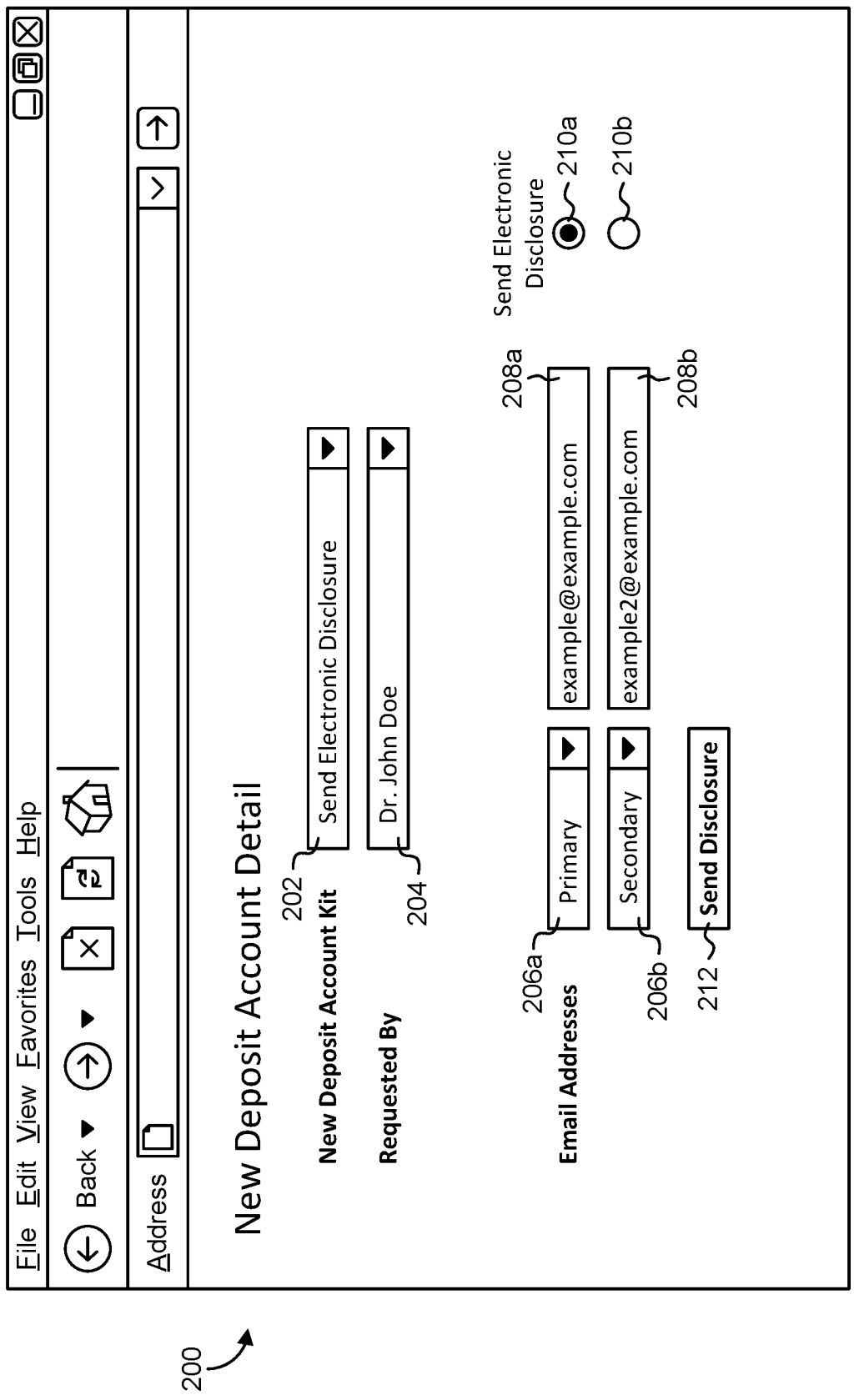
FIG. 2 is a depiction of a user interface that may be used to initiate electronic disclosure delivery according to an exemplary embodiment.

Banker 104 may provide input 109 and unique messaging address 110 to computer system 103 and initiate delivery of electronic disclosure documents 108 via, for example, a graphical user interface screen. For example, referring now to FIG. 2, a user interface 200 that may be used to initiate delivery of electronic disclosure documents according to an exemplary embodiment is shown. User interface 200 may be formatted as, for example, a PDF or HTML, document capable of being displayed on a computing device used by banker 104, and further configured for data entry using a suitable user interface device. User interface 200 may include a selectable dropdown menu 202 that may be used to input a selection of paper disclosure documents or electronic disclosure documents. User interface 200 may further include a selectable dropdown menu 204 that may be used to input the identity of customer 102.

User interface 200 may further include one or more selectable dropdown menus 206, each having a corresponding data entry field 208 such that primary and secondary messaging addresses 210a and 210b for a customer (e.g., customer 102 shown in FIG. 1, or another joint applicant with authority to receive electronic disclosure materials) may be entered. For example, in the illustrated embodiment, dropdown menu 206a indicates that the messaging address in corresponding field 208a is the primary messaging address. Similarly, dropdown menu 206b indicates that the messaging address in corresponding field 208b is a secondary messaging address. For an existing customer 102 who has previously provided a messaging address to financial institution 105, a data entry field may be pre-populated with the existing messaging address. For a new customer 102, or for an existing customer 102 who needs to update the previously provided messaging address, a new messaging address may be entered into data entry field 208.

User interface 200 may further include one or more selectable buttons or check boxes 210 to indicate which messaging address should be used for purposes of electronic delivery of disclosure documents. For example, in the illustrated embodiment, selectable button 210a has been selected to indicate that the messaging address in field 208a should be used for purposes of electronic delivery of disclosure documents. User interface 200 may further include a button 210 that may be selected to initiate delivery of the electronic disclosure documents.

Referring again to FIG. 1, computer system 103 may provide mobile device 101 with access to disclosure documents 108 stored in computer system 103 by first generating and sending an electronic message 112 to mobile device 101. Message 112 may be, for example, an email or text message addressed to a unique messaging address 110 for customer 102 such that customer 102 may access electronic message 112 using mobile device 101. Electronic message 112 may be configured to provide mobile device 101 with access to computer system 103.

According to an exemplary embodiment, electronic message 112 may contain a network address 114, such as a Universal Resource Locator (URL) associated with computer system 103, such as for a web application or landing page hosted by computer system 103. Electronic message 112 may also contain a customer identifier 116, such as a "cookie", used to associate interactions with mobile device 101 with a particular instance of a financial product 106, such as checking account 106a. Network address 114 and customer identifier 116 may be contained in the format of, for example, a hyperlink 118 associated with hypertext or another graphical item that may be selected by customer 102 using mobile device 101.

Figure 3:
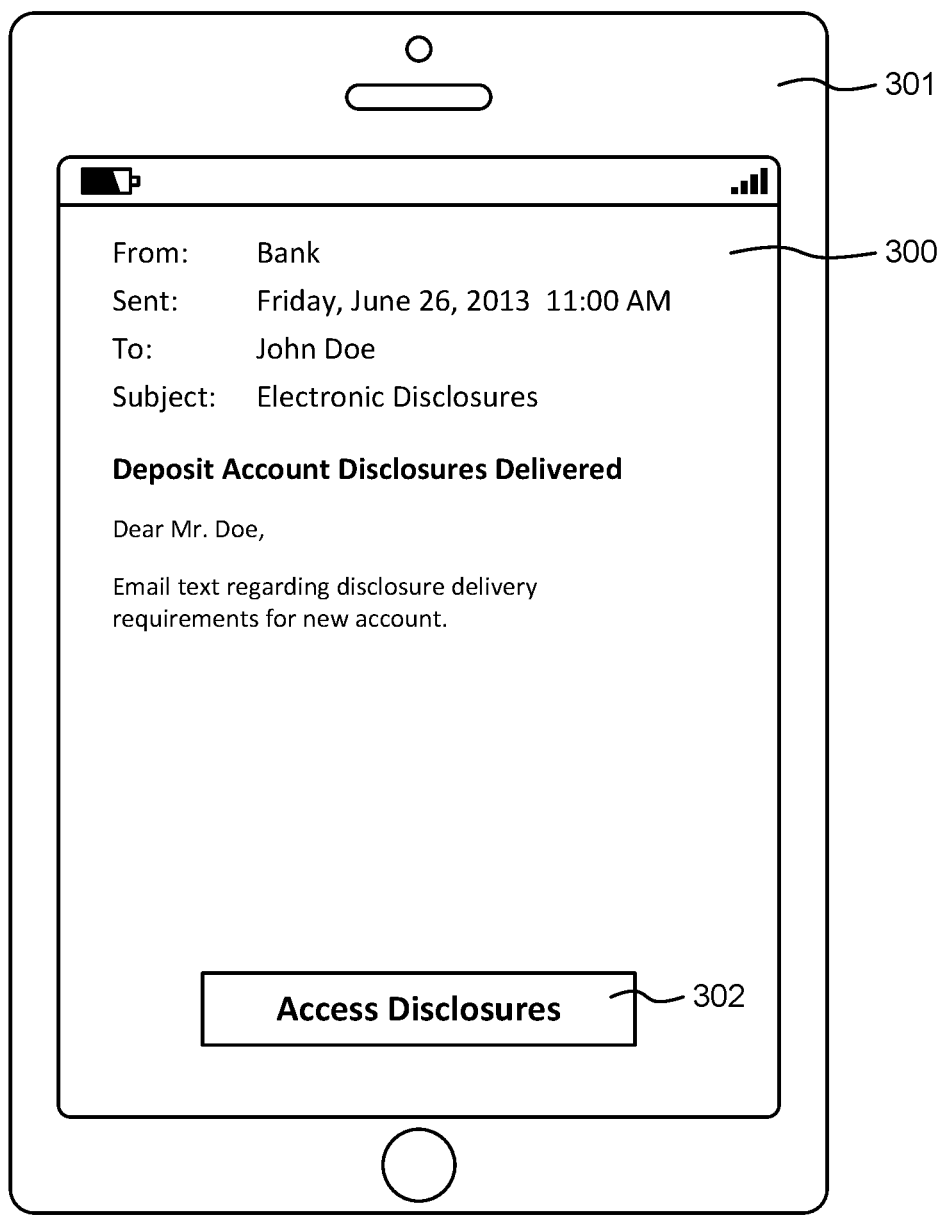
FIG. 3 is a depiction of an electronic message that may be used to provide access to electronic disclosure materials according to an exemplary embodiment.

For example, referring now to FIG. 3, an electronic message 300 that may be used to provide access to electronic disclosure materials according to an exemplary embodiment is shown. In the illustrated embodiment, message 300 is shown displayed on the screen of a mobile device 301. Message 300 includes a hyperlink 302 associated with a graphical button labeled "Access Disclosures" that may be selected in order to access, for example, a web application or landing page hosted by a computer system (e.g., computer system 103 shown in FIG. 1).

Referring again to FIG. 1, when hyperlink 118 is selected, mobile device 101 may execute a client application, such as a web browser or other mobile application configured to create and send, for example, a Hypertext Transfer Protocol (HTTP) request 120 to computer system 103. Request 120 may serve as an indication from customer 102 via mobile device 101 acknowledging that customer 102 has been given access to disclosure documents 108. Request 120 may include network address 114 as well as customer identifier 116. Upon receiving request 120, computer system 103 may determine whether mobile device 101 has indeed accessed network address 114 by verifying that the request contains customer identifier 116.

Computer system 103 may also determine whether customer 102 has provided consent regarding electronic delivery of disclosure documents 108. For example, computer system 103 may use customer number 116 to determine whether customer 102 is an existing online customer of financial institution 105 and has previously provided global consent to receive delivery of disclosure documents 108 in an electronic format. If computer system 103 determines that customer 102 has previously provided global consent to receive delivery of disclosure documents 108 in an electronic format, then computer system 103 may proceed to confirm that mobile device has accessed computer system 103 and provide mobile device 101 with access to electronic disclosure documents 108 related to financial product 106. If, however, computer system 103 determines that customer 102 has not previously provided prior global consent to receive delivery of disclosure documents 108 in an electronic format, computer system 103 may provide mobile device 101 with a consent form 122 regarding disclosure documents 108. The consent obtained consent form 122 may be a one-time consent for a particular account rather than a global consent.

Figure 4:
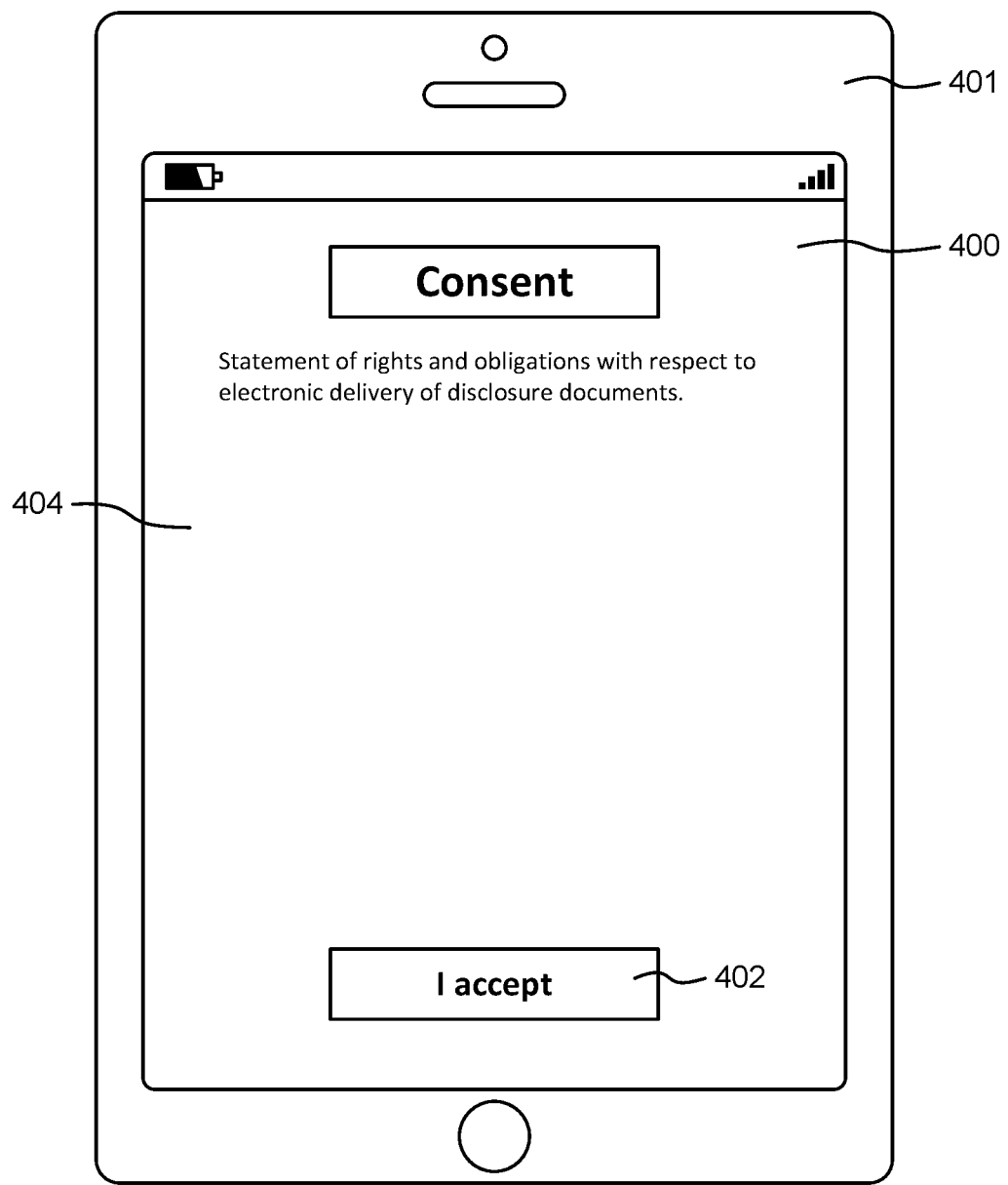
FIG. 4 is a depiction of a user interface that may be used to provide consent for electronic disclosure delivery according to an exemplary embodiment.

According to an exemplary embodiment, consent form 122 may be in the form of, for example, a Hypertext Markup Language (HTML) document viewable on mobile device 101 using a client application. For example, referring now to FIG. 4, a consent form user interface 400 that may be used to provide consent for electronic disclosure delivery according to an exemplary embodiment is shown. In the illustrated embodiment, user interface 400 is shown displayed on the screen of a mobile device 401. User interface 400 includes a hyperlink 402 associated with a graphical button labeled "I Accept" that may be selected using mobile device 401 in order to grant consent to receive electronic delivery of disclosure documents (e.g., disclosure documents 108 shown in FIG. 1). Also shown in FIG. 4 is a statement 404. Statement 404 may be, for example a statement of a customer's rights and obligations with respect to electronic delivery as may be required under certain laws and regulations.

Referring again to FIG. 1, computer system 103 may receive a response 123 from mobile device 101 indicating that consent has been granted to receive disclosure materials in electronic format. Computer system 103 may also provide a confirmation message 124 to banker 104 indicating that mobile device 101 has provided consent to receive delivery of disclosure documents 108 in an electronic format. The consent confirmation may be based on, for example, a prior global consent to receive disclosure documents 108 in electronic format, or based on consent provided from mobile device 101 via consent form 122. Confirmation message 124 may include, for example, a date and time stamp corresponding to when consent was received and the manner in which consent was received, as well as the corresponding customer identifier and related account information. Computer system 103 may further store confirmation message 124 in a memory location associated with the particular financial product 106 based on the customer identifier such that the confirmation message is included with other account information for financial product 106.

Computer system 103 may also provide a confirmation message 126 to banker 104 indicating that mobile device 101 has accessed computer system 103 via hyperlink 118. Confirmation message 126 may include, for example, a date and time stamp corresponding to when computer system 103 was accessed by mobile device 101, as well as the corresponding customer identifier and related account information. Computer system 103 may further store confirmation message 126 in a memory location associated with the particular financial product 106 based on the customer identifier such that the confirmation message is included with other account information for financial product 106.

Computer system 103 may proceed to provide mobile device 101 with access to a list 128 of electronic disclosure documents 108 related to financial product 106 and viewable on mobile device 101. Computer system 103 may provide, for example, a Hypertext Markup Language (HTML) document viewable on mobile device 101 and containing one or more hyperlinks 130. Hyperlinks 130 are associated with network storage locations in computer system 103 containing the respective disclosure documents 108 that may be selected and viewed by customer 102 via mobile device 101. Mobile device 101 may be used to select hyperlink 130 for a particular disclosure document 108 and send a request 132 to computer system 103 to retrieve and send the corresponding disclosure document 108 for display on mobile device 101.

The particular disclosure documents 108 related to financial product 106 (e.g. disclosure documents 108a-e relating to checking account 106a) may be identified based on customer identifier 116. That is, customer identifier 116 may be used by computer system 103 to match varying attributes among disclosure documents 108 with attributes of financial product 106 and/or customer 102. In some embodiments, computer system 103 may dynamically determine the particular disclosure documents 108 related to financial product 106 based on attributes associated with disclosure documents 108. Computer system may, for example, store disclosure documents 108 in a structured format based on parameters associated with particular attributes that may vary among disclosure documents 108. The structured format may be, for example, XML format or another structured data format that allows metadata to be associated with values for particular parameters. Documents 108 may, for example, be stored in a relational database a format wherein metadata is associated with values for a particular parameter. For example, certain parameter values may correspond to table names, column names, or row names of a relational database configured to store disclosure documents 108. The metadata may be descriptive metadata (e.g., indicative of the type of data) and/or structural metadata (e.g., metadata that controls how the parameters are related or organized). The metadata may be interrelated, thereby forming a data structure, and/or may be used to organize and classify other metadata objects.

For example, multiple versions of account agreement terms and conditions document 108a may exist, with variations among the versions based on, for example, a particular state or other jurisdiction attribute such that different terms and conditions apply in different states or jurisdictions. Computer system 103 may store the different versions of document 108a in a structured format according to the various different parameter values for the state or jurisdiction attribute. Upon receiving a request for particular disclosure documents 108 related to financial product 106, computer system 103 may use customer identifier 103 to match values for the parameter associated with the state or jurisdiction attribute of document 108a with the correct values for customer 102.

Similarly, particular types of disclosure documents 108 may or may not be required for a particular customer 102 or a type of financial product 106, depending on varying attributes among types of disclosure documents 108. For example, rate sheet for interest earning accounts 108d, and/or various other policies 108e may or may not apply to financial product 106. Computer system 103 may similarly store the different types of disclosure documents 108 in a structured format according to various different parameter values for the document types. Upon receiving a request for particular disclosure documents 108 related to financial product 106, computer system 103 may use customer identifier 103 to match values for the parameters associated with the types of disclosure documents 108 with the correct values for customer 102.

Figure 5:
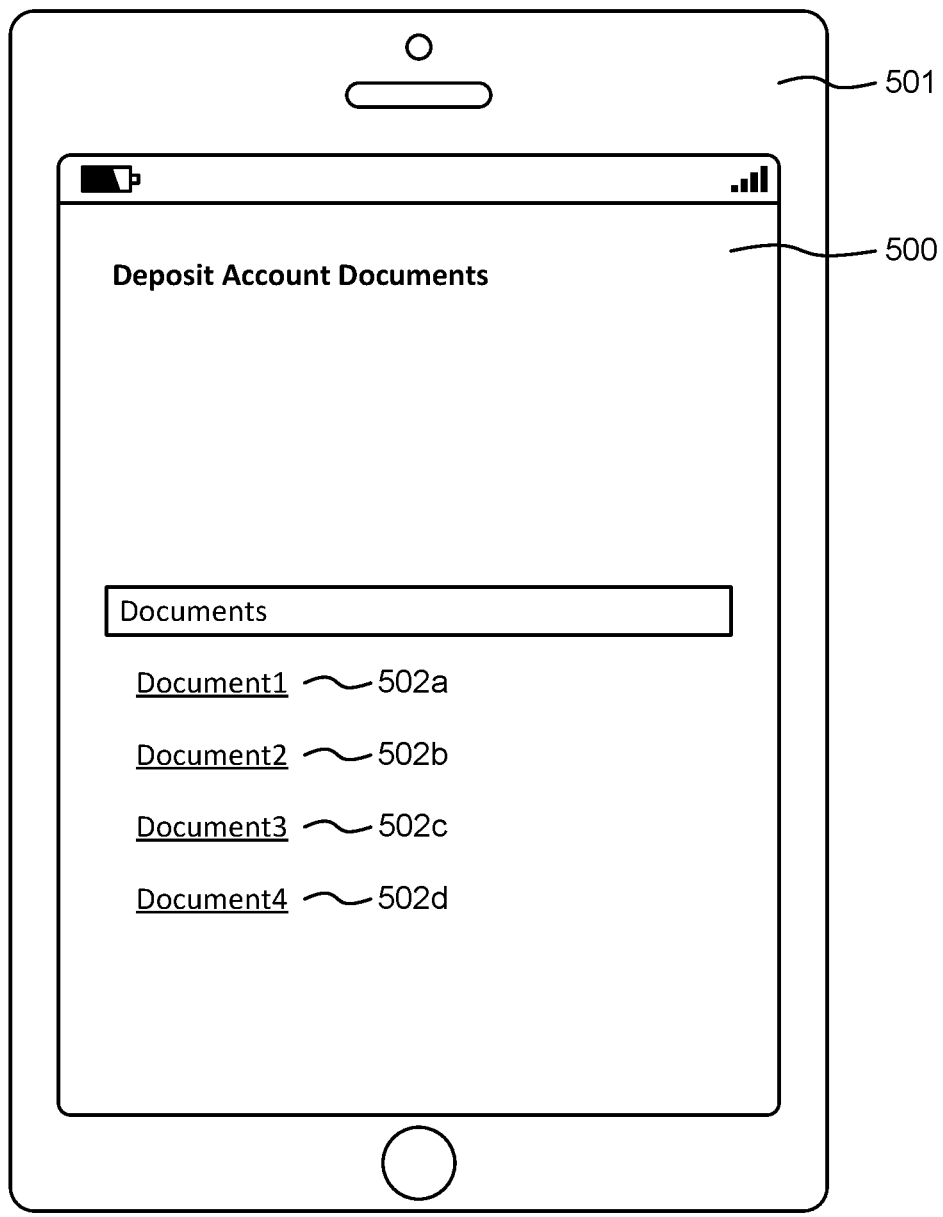
FIG. 5 is a depiction of a user interface that may be used to provide access to electronic disclosure documents according to an exemplary embodiment.

Referring now to FIG. 5, a user interface 500 for a list that may be used to provide access to electronic disclosure documents according to an exemplary embodiment is shown. In the illustrated embodiment, user interface 500 is shown displayed on the screen of a mobile device 501. User interface 500 includes hyperlinks 502 that may be selected using mobile device 501 in order to view a corresponding disclosure document. For example, hyperlinks 502a-502e may be variously selected in order to view respectively an account agreement, an account fee and information schedule, a privacy policy, a rate sheet for interest earning accounts, and other policies governing, for example, overdraft protection services, bill pay services, and electronic or mobile banking (e.g., disclosure documents 108a-108e shown in FIG. 1).

Computer system 103 may also establish the financial product (e.g., open checking account 106a) for the customer based on the confirmation that mobile device 101 has accessed computer system 103 and the confirmation that customer 102 has provided consent regarding delivery of disclosure documents 108 in electronic format. Furthermore, having confirmed that mobile device 101 was able to access computer system 101 using electronic message 112, computer system 103 may also confirm that unique messaging address 110 is a valid and up-to-date address for customer 102. Computer system 103 may then store an indication that the unique messaging address 110 is valid and up-to-date in a memory location associated with the particular financial product 106 based on the customer identifier such that the confirmation message is included with other account information for financial product 106.

Figure 6:
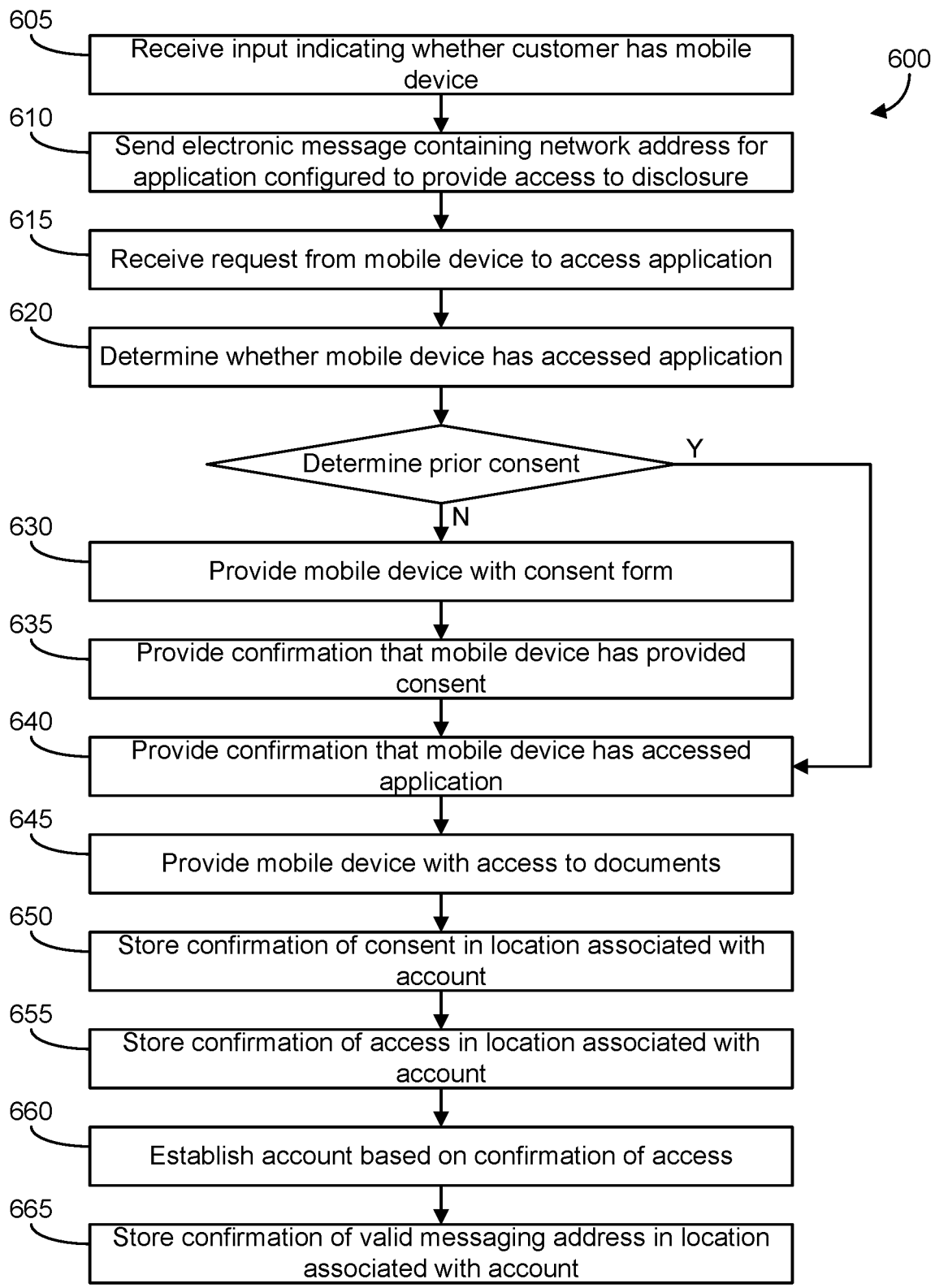
FIG. 6 is a flowchart of a process for providing electronic disclosure delivery according to an exemplary embodiment.

Referring now to FIG. 6, a flowchart of a process 600 for providing electronic delivery of disclosure documents according to an exemplary embodiment is shown. At a step 605, input may be received by a computer system operated by a user, such as a banker, at a financial institution including, for example, a server hosting an application configured to facilitate electronic delivery of disclosure documents. The application may be configured to provide access to disclosure documents related to a financial product, such as a deposit account, upon being accessed by a mobile device.

The input may indicate whether a customer seeking to open an account at a financial institution has a mobile device, such as a cellular phone, smart phone, personal digital assistant (PDA) tablet device, laptop computer or other device. The input may further indicate that the customer may prefer to access electronic disclosure documents related to the account via the mobile device. The customer may further provide the banker with a unique messaging address, such as a personal or business email address, that may be used to contact the customer via the mobile device. The customer may provide such input to the banker at, for example, a store location of the financial institution, or via a telephone connection with the user.

At a step 610, the application may generate and send an electronic message, such as an email or text message addressed to the customer's unique messaging address, that the customer may access using the mobile device. The electronic message may contain a network address for the application in the form of, for example, a hyperlink that may be selected by the customer using the mobile device in order to create and send a request for access to the application. The request may contain, for example, a customer identifier associated with the account.

At a step 615, a request from the mobile device to access the application may be received by the application. The request may serve as an indication from customer 102 via mobile device 101 acknowledging that customer 102 has been given access to the disclosure documents. The request may contain the customer identifier associated with the account. At a step 620, the application may determine whether the mobile device has indeed accessed the application by verifying that the request contains the customer identifier associated with the account.

At a step 625, the application may determine whether the customer has provided consent regarding electronic delivery of the disclosure documents. For example, the application may determine whether the customer is an existing online customer of the financial institution and has previously provided global consent to receive delivery of disclosure documents in an electronic format. If the application determines that the customer has not previously provided global consent to receive delivery of disclosure documents in an electronic format, then the method may continue with a step 630. If, however, the application determines that the customer has previously provided global consent to receive delivery of disclosure documents in an electronic format, then the method may proceed to a step 640.

At a step 630 the application may provide the mobile device with a consent form regarding the disclosure documents. The consent obtained via the form may be a one-time consent for a particular account rather than a global consent. The consent form may include, for example, a hyperlink that may be selected using the mobile device in order to grant consent to receive electronic delivery of the disclosure documents. The consent form may also include a statement of the customer's rights and obligations with respect to electronic delivery of the disclosure documents.

At a step 635, the application may provide a confirmation to the banker indicating that the customer has provided consent to receive delivery of disclosure documents in an electronic format. The consent confirmation may be based on, for example, a prior global consent to receive the disclosure documents in electronic format, or based on consent provided from the mobile device via a consent form. The confirmation message may include, for example, a date and time stamp corresponding to when consent was received and the manner in which consent was received, as well as the corresponding customer identifier and related account information.

At a step 640, the application may provide a confirmation to the banker indicating that the mobile device has accessed the application. The confirmation message may include, for example, a date and time stamp corresponding to when the application was accessed by the mobile device, as well as the corresponding customer identifier and related account information.

At a step 645 the application may provide the mobile device with access to the electronic disclosure documents based on the customer identifier. The application may provide the mobile device with a list of disclosure documents in the form of, for example, a document including hyperlinks to network storage locations containing the respective disclosure documents that may be selected and viewed by the customer via the mobile device. The particular disclosure documents related to the account may be identified based on the customer identifier. The mobile device may be used to select a hyperlink for a disclosure document and send a request to the application to retrieve and send the corresponding disclosure document for display on the mobile device.

At a step 650, the application may store the confirmation that the mobile device has provided consent regarding electronic delivery of the disclosure documents in a memory location associated with the account based on the customer identifier. At a step 655, the application may store the confirmation that the mobile device has accessed the application in a memory location associated with the account based on the customer identifier. At a step 660, the application may establish the account for the customer based on the confirmation that the mobile device has accessed the application. At a step 665, the application may store an indication that the customer's unique messaging address is valid and up-to-date in a memory location associated with the account based on the customer identifier.

Figure 7:
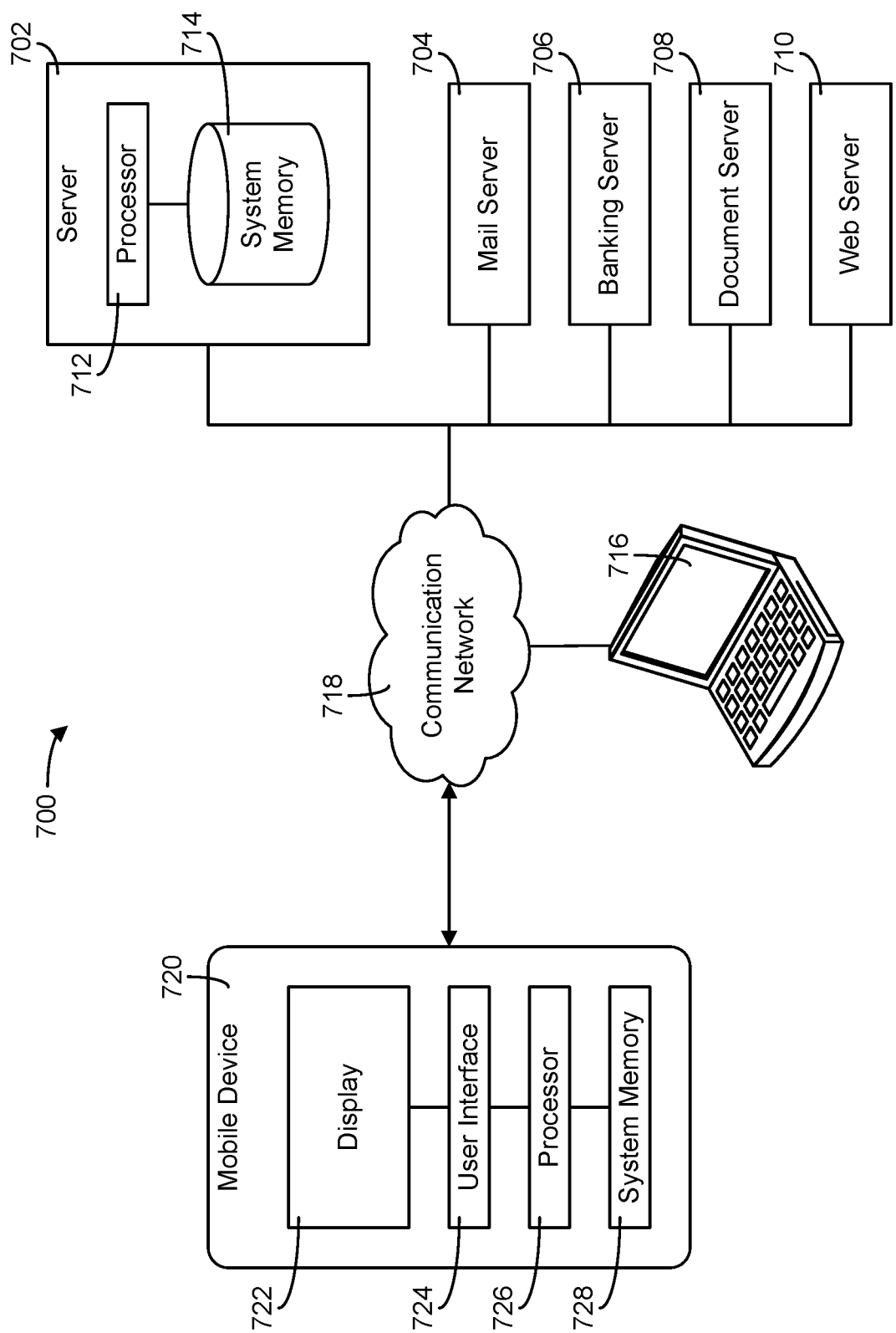
FIG. 7 is a block diagram illustrating a system for providing electronic disclosure delivery according to an exemplary embodiment.

Referring now to FIG. 7, a block diagram illustrating a system 700 for providing electronic delivery of disclosure documents according to an exemplary embodiment is shown. System 700 may be, for example, a computer system at a financial institution, such as a bank. System 700 may include, for example, a server 702. Server 702 may be implemented by, for example, general purpose or special purpose computers or other machines with a processor and memory configured to store applications including program code in the form of machine-executable instructions or data structures. In particular, server 702 may include one or more applications configured to implement the various embodiments shown and described above with reference to FIGS. 1-6.

In some embodiments, server 702 may be implemented as a single unit for providing electronic delivery of disclosure documents. In other embodiments, system 700 may distribute functionality across multiple servers. For example, system 700 may additionally utilize a mail server 704 for delivering text or email messages, a banking server 706 for managing accounts and receiving input from users, such as bankers, associated with the financial institution, a document server 708 for storing disclosure documents in an electronic format, a rate server for generating rate sheet information, and a web server 710 for hosting an external web application.

Server 702 may include a processor 712. Processor 712 may be implemented in hardware, firmware, software, or any combination of these methods. Server 702 may have one or more processors 712 that use the same or a different processing technology. Additionally, processor 712 may be a separate component or may be embedded within another component of server 702. Processor 712 may execute applications including program code in the form of machine-executable instructions that may be written using one or more programming languages, scripting languages, assembly languages, etc. The instructions may be carried out by, for example, a special purpose computer, logic circuits, or hardware circuits. Processor 712 may execute, for example, one or more applications configured to implement the various embodiments shown and described above with reference to FIGS. 1-6.

Server 702 may further include a system memory 714. System memory 714 may include, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired applications including program code in the form of machine-executable instructions or data structures and which may be accessed by a general purpose or special purpose computer or other machine. Server 702 may have one or more system memories 714 that use the same or a different memory technology.

System memory 714 may store one or more applications configured to implement the various embodiments shown and described above with reference to FIGS. 1-6. For example, system memory 714 may store an application configured to generate a graphical user interface when executed by processor 712, such as one or more dynamically generated web pages presented to customers via browser or mobile applications operating on mobile devices. The graphical user interface may prompt the customers to take certain actions and may receive user inputs provided in response to such prompting.

Server 702 may be accessed by bankers associated with the financial institution via one or more user devices 716 such as, for example, in-store computers at one or more branch locations associated with the financial institution. User device 716 may be, for example, a personal computer or laptop, a hand-held device, a multi-processor system, microprocessor-based or programmable consumer electronics, network PC, minicomputer, mainframe computer, and so on. User devices 716 may include a monitor, keyboard, a keypad, a mouse, joystick or other input devices performing a similar function.

User devices 716 may access server 702 via, for example, a communication network 718. Communication network 718 may allow user devices 716 to link to server 702 by, for example, a wired, wireless or combination local area network, wide area network (Internet), etc. Communication network 718 may include any necessary hardware and or software to facilitate secure transmission of data.

Server 702 may also be accessed by a customer using a mobile device 720. Mobile device 720 may be, for example, a cellular phone, smart phone, personal digital assistant (PDA), tablet device, laptop computer, or other device. Mobile device 720 may include a display 722, a user interface 724, a processor 726, a system memory 728, and a system bus that couples various system components including system memory 726 to processor 724.

Display 722 may be, for example, an LED or LCD display which may also include a touch screen. User interface 724 may include, for example, a keyboard, a keypad, a mouse, joystick or other input device performing a similar function. Processor 726 may be implemented in hardware, firmware, software, or any combination of these methods. Mobile device 720 may have one or more processors 726 that use the same or a different processing technology. Additionally, processor 726 may be a separate component of mobile device 720, or may be embedded within another component of mobile device 720. Processor 726 may execute applications including program code in the form of machine-executable instructions that may be written using one or more programming languages, scripting languages, assembly languages, etc. The instructions may be carried out by, for example, a special purpose computer, logic circuits, or hardware circuits. Processor 726 may execute, for example, email, browser or mobile applications stored in memory 728. The email, browser or mobile applications stored in memory 728 may be any type of software that is capable of communicating with server 702 via a network connection. System memory 728 may be, for example, RAM, ROM, EPROM, EEPROM, CD-ROM or any other medium which may be used to carry or store desired applications including program code in the form of machine-executable instructions or data structures.

Mobile device 720 may communicate with server 702 via communication network 718 through, for example, a wired, wireless or combination local area network, wide area network (Internet), etc. Programs may run on respective computers to create a client-server relationship. For example, in some embodiments, mobile device 720 may execute a web browser or mobile application to interact with server 702, and data may be provided to a user interface of the web browser or mobile application executing on mobile device 720. For example, server 702 may provide content to the web browser or mobile application of mobile device 720 in response to a request received from the mobile device.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, configured to:
   receive, via a computing device of a customer, a request to receive access to one or more disclosure documents associated with a financial account in electronic format, the request comprising a customer identifier and a type of financial account selected by the customer;
   verify that the customer identifier corresponds to a retrievably stored customer identifier associated with the customer;
   retrieve, from a database of required disclosure documents, the one or more disclosure documents;
   send, to the computing device of the customer via a unique messaging address associated with the customer, an electronic consent request to receive the one or more disclosure documents in electronic format;
   determine that consent to receive the one or more disclosure documents has been received from the customer based on receiving a response from the customer accepting the electronic consent request;
   send, to the computing device of the customer, an electronic message comprising a hyperlink, wherein the hyperlink, when selected by the customer, is configured to transmit to the customer and display on the computing device of the customer the one or more disclosure documents;
   access a customer database and identify a customer account associated with the customer identifier contained in the request to receive access to the one or more disclosure documents in electronic format;
   in response to verifying that the request to receive access to the one or more disclosure documents in electronic format contains the customer identifier corresponding to the customer and identifying the customer account in the customer database that is associated with the customer identifier, create and store an audit trail in a memory location of the customer database associated with the customer account, wherein the audit trail includes a confirmation that the customer was provided access to the one or more disclosure documents;
   store, in the audit trail, a first confirmation that the customer has consented to receive the one or more disclosure documents in electronic format; and
   store, in the audit trail, a second confirmation that the customer has accessed the hyperlink via the computing device of the customer.

2. The system of claim 1, wherein the audit trail further includes a date and time stamp corresponding to when the request to receive access to the one or more disclosure documents in electronic format was received from the customer.

3. The system of claim 1, wherein the system is further configured to send the electronic message to the unique messaging address associated with the customer;
   wherein the request to receive access to the one or more disclosure documents in electronic format is received by the system in response to the electronic message sent to the unique messaging address associated with the customer.

4. The system of claim 3, wherein the electronic message sent to the unique messaging address associated with the customer contains the customer identifier.

5. The system of claim 1, wherein the one or more disclosure documents are retrievably stored in a structured format, the structured format based at least partially on at least one attribute indicative of a state or jurisdiction and at least one account-specific parameter.

6. The system of claim 1, wherein the customer identifier includes a parameter indicative of a state or jurisdiction.

7. A method, the method comprising:
   receiving, via a computing device of a customer, a request to receive access to one or more disclosure documents associated with a financial account in electronic format, the request comprising a customer identifier and a type of financial account selected by the customer;

verifying that the customer identifier corresponds to a retrievably stored customer identifier associated with the customer;

retrieving, from a database of required disclosure documents, the one or more disclosure documents;

sending, to the computing device of the customer via a unique messaging address associated with the customer, an electronic consent request to receive the one or more disclosure documents in electronic format;

determining that consent to receive the one or more disclosure documents has been received from the customer based on receiving a response from the customer accepting the electronic consent request;

sending, to the computing device of the customer, an electronic message comprising a hyperlink, wherein the hyperlink, when selected by the customer, is configured to transmit to the customer and display on the computing device of the customer the one or more disclosure documents;

accessing a customer database and identifying a customer account associated with the customer identifier contained in the request to receive access to the one or more disclosure documents in electronic format;

in response to verifying that the request to receive access to the one or more disclosure documents in electronic format contains the customer identifier corresponding to the customer and identifying the customer account in the customer database that is associated with the customer identifier, creating and storing an audit trail in a memory location of the customer database associated with the customer account, wherein the audit trail includes a confirmation that the customer was provided access to the one or more disclosure documents;

storing, in the audit trail, a first confirmation that the customer has consented to receive the one or more disclosure documents in electronic format; and storing, in the audit trail, a second confirmation that the customer has accessed the hyperlink via the computing device of the customer.

8. The method of claim 7, wherein the audit trail further includes a date and time stamp corresponding to when the request to receive access to the one or more disclosure documents in electronic format was received from the customer.

9. The method of claim 7, further comprising sending the electronic message to the unique messaging address associated with the customer;

wherein the request to receive access to the one or more disclosure documents in electronic format is received in response to the electronic message sent to the unique messaging address associated with the customer.

10. The method of claim 9, wherein the electronic message sent to the unique messaging address associated with the customer contains the customer identifier.

11. The method of claim 7, wherein the one or more disclosure documents are retrievably stored in a structured format, the structured format based at least partially on at least one attribute indicative of a state or jurisdiction and at least one account-specific parameter.

12. The method of claim 7, wherein the customer identifier includes a parameter indicative of a state or jurisdiction.

13. A non-transitory computer readable medium storing a program that, when executed by a processor of a computing system, causes the computing system to:

receive, via a computing device of a customer, a request to receive access to one or more disclosure documents associated with a financial account in electronic format, the request comprising a customer identifier and a type of financial account selected by the customer;

verify that the customer identifier corresponds to a retrievably stored customer identifier associated with the customer;

retrieve from a database of required disclosure documents, the one or more disclosure documents;

send, to the computing device of the customer via a unique messaging address associated with the customer, an electronic consent request to receive the one or more disclosure documents in electronic format;

determine that consent to receive the one or more disclosure documents has been received from the customer based on receiving a response from the customer accepting the electronic consent request;

send, to the computing device of the customer, an electronic message comprising a hyperlink, wherein the hyperlink, when selected by the customer, is configured to transmit to the customer and display on the computing device of the customer the one or more disclosure documents;

access a customer database and identify a customer account associated with the customer identifier contained in the request to receive access to the one or more disclosure documents in electronic format;

in response to verifying that the request to receive access to the one or more disclosure documents in electronic format contains the customer identifier corresponding to the customer and identifying the customer account in the customer database that is associated with the customer identifier, create and store an audit trail in a memory location of the customer database associated with the customer account, wherein the audit trail includes a confirmation that the customer was provided access to the one or more disclosure documents;

store, in the audit trail, a confirmation that the customer has consented to receive the one or more disclosure documents in electronic format; and store, in the audit trail, a second confirmation that the customer has accessed the hyperlink via the computing device of the customer.

14. The non-transitory computer readable medium of claim 13, wherein the audit trail further includes a date and time stamp corresponding to when the request to receive access to the one or more disclosure documents in electronic format was received from the customer.

15. The non-transitory computer readable medium of claim 13, wherein the program, when executed by the processor, further causes the computing system to send the electronic message to the unique messaging address associated with the customer;

wherein the request to receive access to the one or more disclosure documents in electronic format is received by the computing system in response to the electronic message sent to the unique messaging address associated with the customer.

16. The non-transitory computer readable medium of claim 15, wherein the electronic message sent to the unique messaging address associated with the customer contains the customer identifier.

17. The non-transitory computer readable medium of claim 13, wherein the one or more disclosure documents are retrievably stored in a structured format, the structured format based at least partially on at least one attribute indicative of a state or jurisdiction and at least one account-specific parameter.

\* \* \* \* \*